July 7, 1936.  O. D. PREMO  2,046,580
CAMERA
Filed Oct. 23, 1933
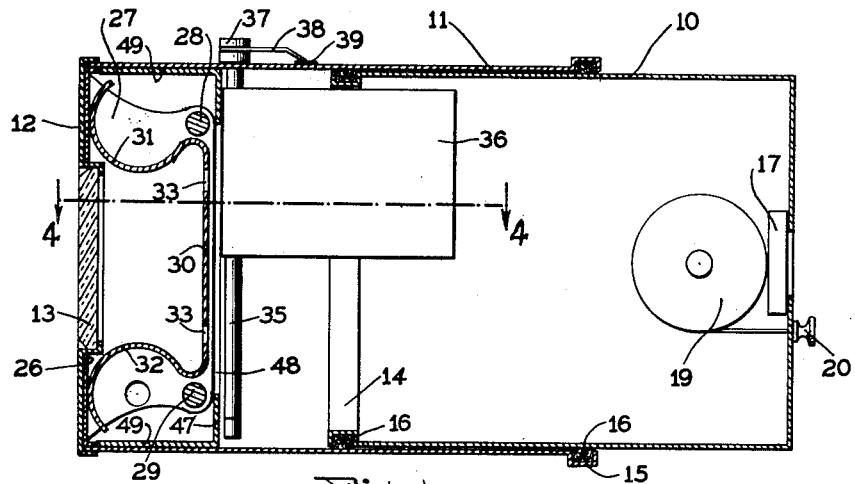
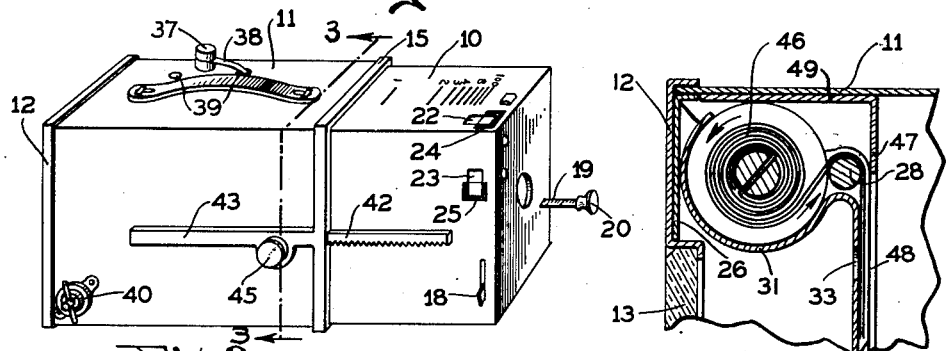
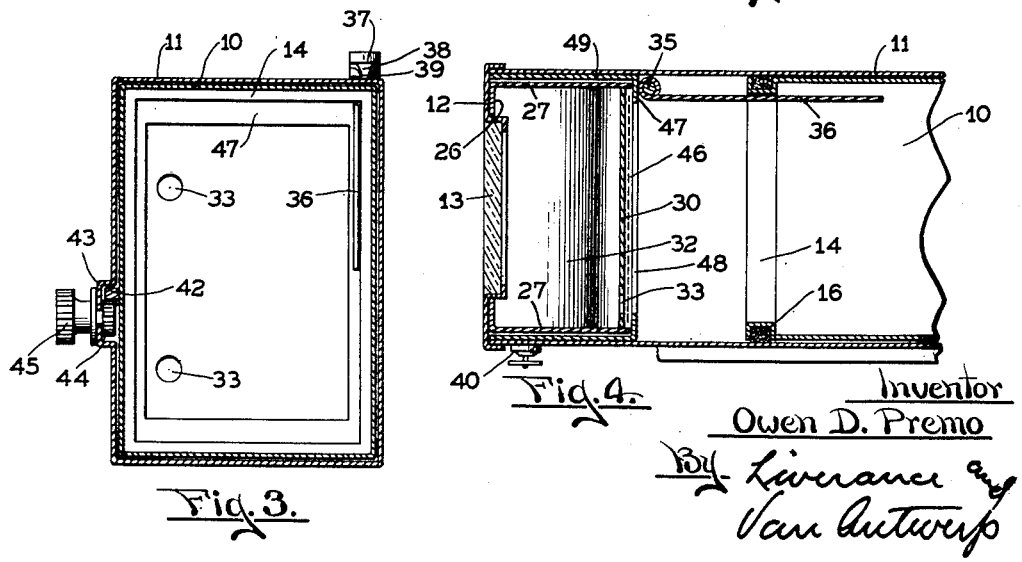
Inventor
Owen D. Premo
By Liverance and Van Antwerp
Attorneys Patented July 7, 1936

2,046,580

UNITED STATES PATENT OFFICE 2,046,580

CAMERA

Owen D. Premo, Muskegon Heights, Mich.

Application October 23, 1933, Serial No. 694,775

9 Claims. (Cl. 95—34)

This invention relates to a camera and more particularly to one of a box type construction featuring a sliding or telescoping box unit which contains the lens and shutter equipment and which is adapted to be slidably mounted in a second or rear box unit.

As above set forth, my invention includes two sliding box-like units and one feature and advantage of such lies in the sliding connection between these box units, each of the telescoping ends thereof being channeled and receiving resilient material therein, thus forming a double connection therebetween. This double connection serves two purposes. In the first place, the double connection keeps the two parts in perfect alinement at all times and, in the second place, a double protection is had against the entry of light into the camera.

Another advantage of my improved construction resides in the flexible roll supporting means, this receiving the new and exposed rolls of film in such a manner that the sensitive emulsion side thereof does not come into contact with any portion of the camera, and as a result there will be no scratching or marring of the emulsion side due to its movement in the camera.

Another feature of the invention resides in the concealing of a tape or scale immediately inside the front of the camera, and the end of the tape extending through the front of the camera and having a small knob thereon. Thus the tape or scale is accessible at all times whereby one may pull the same outwardly to accurately position the camera with relation to the object or person whose photograph is being taken. This is especially desirable for portraits taken at close range. It will be noted that the distance graduations, these being correspondingly adjusted with the preceding adjustment are located centrally of and on the top side of the outer sliding box unit and are adapted to be positioned in alinement with the front edge of the rear box unit as will be readily understood by those skilled in this art.

Another advantage resides in my construction whereby a mask, having an opening of the desired shape formed therein, may be readily inserted immediately in front of the sensitive side of the film. This mask is removable and consequently any one of a series of masks may be used, this giving the desired outline to the image or picture.

Yet another advantage of my invention resides in a swinging gate as will be fully set forth in the following specification, this gate rendering it possible to cover half of the film and reduce the size of the picture so that the number of exposures attainable on one roll of film may be doubled.

In this connection it is to be appreciated that I provide novel inspecting means consisting of two holes, predeterminedly spaced, through which the indicia on the film is visible. As is well understood by those skilled in this art, the usual roll of film has a series of single indicia or numbers, each corresponding to a portion of the film on which an exposure of ordinary size may be taken. One of the holes through which the indicia is visible is so located as to cause proper positioning of the film when the indicia is visible therethrough. The other hole is spaced from the first hole a distance equal to half the height of the ordinary exposure and thus it is possible to roll the film until the indicia becomes visible through the second hole and when in this position the film is properly positioned in order to take a picture of half size. The gate, of course, is properly manipulated in conjunction with the use of these two holes of predetermined relationship. Thus a series of full-size exposures may be taken in the usual manner by the utilization of the upper hole. Also, a series of half-size exposures may be taken by alternate use of the holes. Furthermore, an intermixed group of full-size and half-size exposures may be taken without any overlapping of any of the views upon the film or without any unnecessary spacing therebetween by proper manipulation of the gate and of the film rolling means.

Further advantages will be apparent as the description proceeds.

In the drawing:—

Fig. 1 is a longitudinal sectional view through a camera constructed in accordance with the principles of my invention.

Fig. 2 is a perspective view of the same.

Fig. 3 is a cross sectional view taken along the line 3—3 of Fig. 2.

Fig. 4 is a fragmentary sectional view taken along the line 4—4 of Fig. 1.

Fig. 5 is a fragmentary enlarged view of the upper left hand corner of Fig. 1, the unused film being shown in place.

Like numerals refer to like parts throughout the several views.

Referring particularly to Figs. 1 and 2, numeral 10 indicates the front box unit, 11 the rear box unit and 12 the rear removable cover for the camera, such cover having a cover glass 13 positioned therein as clearly shown in the drawing.

The front box unit has a channeled portion 14 and the rear box unit has a channeled portion 16, see Fig. 1, and each of these grooves receives felt or the like 18 whereby a snug sliding fit is formed between these members.

The front box unit 10 has the usual lens and shutter construction 17 positioned therein, and, see Fig. 2, the shutter lever 18 extends through one side thereof in the usual manner. A spring wound tape or scale 19 extends through the front cover and is provided with the knob 20 which may be grasped to pull the tape or scale outwardly as previously described.

The top of the box, see Fig. 2, is marked with indicia in order that the proper sliding adjustment may be had between the two units in order to bring the subject which is being photographed into the proper focus.

View finders 22 and 23 are provided on the top and side, respectively, of the front box unit and are partially surrounded by the colored portions 24 and 25, respectively, the purpose of these to be later set forth.

Referring now to the rear box unit 11, 12, as previously described, indicates the removable rear cover member and a U-shaped supporting member is located adjacent thereto. This U-shaped supporting member has a back 26 and spaced sides 27, these sides carrying the rollers 28 and 29 near their front edges. The back 26 has a center opening which is of substantially the same size as the opening through the cover member 12 as is shown in Figs. 1 and 5.

A flexible supporting means has a flat central portion 30, such being suitably attached to the spaced side members 27 of the U-shaped support, and is extended at either end as indicated at 31 and 32 to form resilient pockets to receive the new and used rolls of film. The central portion 30 has view holes 33 therein as shown in Fig. 1.

A shaft 35 extends through the rear box unit 11 at one side thereof and supports a shield or gate 36 thereon, this gate being of such size as to cover exactly one half of the film which is in exposed position. The upper end of the shaft 35 has operating means 37 thereon whereby it may be moved to and from its operative position and a spring pointer 38, resting in detents 39, maintains the gate or shield in the desired position. As shown in Figs. 2 and 4, a film roll clutch mechanism 40 is so positioned as to be in alinement with the center of the exposed roll of film and operation of such moves the film as will be understood.

The front box unit 10 is provided with a rack 42 along one side thereof, see Figs. 2 and 3, and the rear box unit 11 has a corresponding channel portion 43 adapted to slidably receive the rack 42. A pinion 44, see Fig. 3, meshes with the rack 42 and a knurled knob 45 operates the same.

The operation

The object or person whose photograph is to be taken, is located in front of the camera in correctly spaced position therefrom, the spring wound tape or scale 19 being utilized as previously explained and the box units being properly telescoped relative to one another, this telescoping being done by proper rotation of the knob 45.

Previous to the above described manipulations, the rear cover plate and the U-shaped support, such being made as one if desired, have been removed and a roll of film 46, see Fig. 5, inserted in position, the film passing over the upper and outer side of the roller 28 and then downwardly in parallelism with the opening through the mask 47. The mask 47 is formed with an opening 48 therethrough and sides 49 from a box-like construction. The opening 48, is of any desired shape and it will be understood that the sides 49 slidably and frictionally engage the inner rear walls of the box unit 11 and consequently any chosen one of several mask members may be inserted in position.

The rear cover member and the U-shaped supporting member are now replaced in the rear box unit and the clutch mechanism 40 is adjusted to position whereby its rotation will cause unwinding of the sensitized film as indicated by the arrows in Fig. 5. This film is unwound until it is properly positioned as is evidenced by the signal members appearing on its rear side, such being visible through the opening 33 and the cover glass 13. If desired, this cover glass may be entirely omitted.

If it is desired to take a full size picture, the gate 36 is positioned as shown in Fig. 4, that is, adjacent the side of the camera and in inoperative position. In this position, only the upper opening 33 is utilized. When it is desired to take half size pictures, the gate 36 is swung across the camera and thus the upper half of the exposed film is shielded. The image of the picture to be taken is now focused in one or the other of the view finders 22 and 23, that portion of the view finders being utilized which is inclosed by the colored indicia thereon, and then the picture is snapped, the resulting picture being one-half of the normal size. Next, the mechanism 40 is rotated and the film moved downwardly until the next signal number appears directly behind the lower opening 33 and when this occurs the film is again in such a position as to permit the taking of the next picture. This next picture can be either half or full size.

Having thus revealed this invention, I claim as new and desire to secure the following combinations and elements or equivalents thereof, by Letters Patent of the United States.

I claim:

1. In a camera construction, a rear box unit, a front box unit telescopically mounted therein, lens and shutter mechanism in said front box unit, a mask member having a flat central portion and rearwardly extending walls removably mounted in the rear end of the rear box unit, said central portion of the mask member being cut away to form an opening of the desired shape, a bracket member located interiorly of the walls of the said mask member, means mounted on the said bracket member for supporting a film in alinement with, but at the rear side of said opening through the mask member, and cover means for the rear box unit.

2. A device as set forth in claim 1 in which the rear cover has a transparent member therein.

3. A combination of elements as set forth in claim 1 in which the means for supporting said film has two openings therethrough, said openings being to the top and bottom thereof, and gate means for concealing one half of the opening through the mask member.

4. In combination, a box unit, means at one end thereof for supporting a lens, means at the other end thereof for supporting a film, mask means having an opening of predetermined dimensions for taking a full sized picture, a vertical post extending through said box unit, means at the top of the post for turning the same, spring means near the top of the post for holding the same in its adjusted position, a gate rigidly attached to said post inside of said box unit, said gate being adapted to shut off one half of the area of the said opening through the mask member for the purpose described.

5. An article of manufacture, comprising, a rear box unit, a front box unit having a lens and shutter mechanism associated therewith, a member including a central portion and curved to form two outwardly facing recesses adapted to receive rolls of film, said central portion being located closer to the front box unit than the said recesses whereby the sensitized side of the film does not contact with the said central portion, the said central portion being fastened to the rear box unit, the portion of the member forming the recesses having flexible means contacting the roll of film for the purpose described.

6. In a camera adapted to receive a standard roll of film having the usual indicia thereon, said camera consisting of a rear box unit and a front box unit slidably received therein, said camera having means in the rear box unit for supporting and for permitting unrolling of the film, means for exposing a portion of the film equal in length to the distance between the indicia, gate means pivotally mounted in the rear box unit and movable to conceal approximately one-half of the said exposed portion of the film, and also movable to a position partly within the front box unit to expose all of the film, said camera having one opening for exposing one of the indicia on the film when the roll of film is located so as to expose a length of film equal to the distance between the said indicia, and a second opening located along the film in the direction which the film is moved a distance equal to one-half of the distance between the indicia on the film for the purpose described.

7. In a device of the class described, a front box unit of rectangular shape carrying a lens and shutter mechanism and having its rear edge bent inwardly a certain distance, then rearwardly, and outwardly the same distance, to form an outwardly shaped channel member, a rear box unit of rectangular shape carrying a film and adapted to slidingly engage over the channel of the front box unit and having its front edge bent outwardly, forwardly and then inwardly to form an inwardly facing channel and resilient packing means located in each of the said channels, the inner periphery of the inwardly facing channel's packing being substantially coextensive with the outer periphery of the outwardly facing channel's packing, said resilient packing means expanding against the adjacent box unit to form a frictional engagement therebetween but permitting a direct sliding engagement and disengagement therebetween.

8. In a camera construction adapted to receive a standard roll of film, a front box unit of rectangular construction having a lens and shutter construction thereon, a rear box unit of rectangular construction adapted to telescopically engage around the front box unit, said film being received in said rear box unit, said rear box unit having a longitudinal channel along one of its sides between the top and bottom of the box unit, a pinion mounted upon the rear box unit and having teeth extending into the channel and a rack rigidly attached to the front box unit in alinement with and adapted to extend into the channel whereby rotation of the pinion causes relative reciprocation of the box units and whereby guiding means is provided therebetween.

9. In a camera construction of the class described adapted to receive a standard roll of film, a front box unit of rectangular construction having a lens and shutter construction thereon, a rear box unit of rectangular construction adapted to telescopically engage around the front box unit, said film being received in said rear box unit, each box unit having a channel facing the other box unit, and packing therein, the packings having their contacting or operative faces in substantially the same plane for the purpose described.

OWEN D. PREMO.